(12) United States Patent
    Park

(10) Patent No.: US 9,099,867 B2
(45) Date of Patent: Aug. 4, 2015

(54) BATTERY PACK AND CHARGING SYSTEM INCLUDING BATTERY PACK

(75) Inventor: Taeheom Park, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 380 days.

(21) Appl. No.: 13/244,147

(22) Filed: Sep. 23, 2011

(65) Prior Publication Data

US 2012/0206088 A1    Aug. 16, 2012

(30) Foreign Application Priority Data

Feb. 10, 2011 (KR) ........................ 10-2011-0011866

(51) Int. Cl.
    *H02J 7/00*    (2006.01)
    *H01F 7/02*    (2006.01)
    *H02J 7/02*    (2006.01)

(52) U.S. Cl.
    CPC ................ *H02J 7/00* (2013.01); *H01F 7/0247* (2013.01); *H02J 7/0004* (2013.01); *H02J 7/025* (2013.01)

(58) Field of Classification Search
    CPC .................. H02J 7/0004; H02J 7/0036; H02J 2007/0049; H02J 7/025
    USPC .................................................. 320/106, 108
    See application file for complete search history.

(56) References Cited

U.S. PATENT DOCUMENTS

| 4,942,352 | A | * | 7/1990 | Sano | 320/134 |
| 5,111,128 | A | * | 5/1992 | Branan et al. | 320/106 |
| 6,726,240 | B2 | * | 4/2004 | Riha | 280/728.3 |
| 7,026,789 | B2 | * | 4/2006 | Bozzone et al. | 320/108 |
| 7,477,039 | B2 | * | 1/2009 | Rodarte | 320/115 |
| 2004/0232702 | A1 | * | 11/2004 | He | 290/31 |
| 2007/0279002 | A1 | * | 12/2007 | Partovi | 320/115 |
| 2008/0048876 | A1 | * | 2/2008 | Miyajima et al. | 340/636.1 |
| 2010/0081377 | A1 | * | 4/2010 | Chatterjee et al. | 455/41.1 |
| 2010/0123430 | A1 | * | 5/2010 | Kojima et al. | 320/108 |

FOREIGN PATENT DOCUMENTS

| JP | 2000-357542 A | 12/2000 |
| JP | 2009-213294 A | 9/2009 |
| KR | 10-2002-0086426 A | 11/2002 |
| KR | 10-2009-0106965 A | 10/2009 |
| KR | 10-2010-0050197 A | 5/2010 |

OTHER PUBLICATIONS

Korean Office Action dated Jul. 18, 2012 for Korean Patent Application No. KR 10-2011-0011866 which corresponds to captioned U.S. Appl. No. 13/244,147.

* cited by examiner

*Primary Examiner* — Samuel Berhanu
*Assistant Examiner* — Jerry D Robbins
(74) *Attorney, Agent, or Firm* — Knobbe Martens Olson & Bear LLP

(57) ABSTRACT

A battery pack and a charging system including the battery pack are disclosed. According to one aspect, when the battery pack is charged, magnets are used to fix the battery pack in a correct position within a charger, thereby improving charging efficiency. The battery pack includes at least one first magnet and a second magnet having an opposite magnetic pole from that of the first magnet.

14 Claims, 6 Drawing Sheets

BATTERY PACK AND CHARGING SYSTEM INCLUDING BATTERY PACK

CROSS-REFERENCE TO RELATED PATENT APPLICATION

This application claims the benefit of Korean Patent Application No. 10-2011-0011866 filed on Feb. 10, 2011, in the Korean Intellectual Property Office, and entitled: "Battery pack and charging system including Battery pack," the disclosure of which is incorporated herein in its entirety by reference.

BACKGROUND

1. Field

The disclosed technology relates to a battery pack and a charging system including the battery pack.

2. Description of the Related Technology

Battery packs are used to supply power to terminals of various portable devices including cellular phones, personal digital assistants (PDAs), MP3 players, digital multimedia broadcasting (DMB) terminals, portable music players (PMPs), tablet computers, and the like.

When voltage of a battery pack drops below a certain level, the battery pack can be charged by connecting a charging terminal of a charger to a connection terminal of the battery pack.

Each battery pack may be configured to have its own identification (ID). For example, a radio frequency identification (RFID) may be used to identify a battery pack. The battery pack may be identified by inputting a specific signal to a tag and receiving a specific response signal from the tag corresponding to the specific input signal.

SUMMARY OF CERTAIN INVENTIVE ASPECTS

According to one aspect, a battery pack is disclosed. The battery pack includes a battery and a battery case configured to house the battery. The battery pack further includes a first magnet disposed on the case, and a second magnet disposed on the case and having an opposite magnetic pole orientation from that of the first magnet. The magnets are configured to position the battery pack in a battery charger for charging.

According to another aspect, a battery pack charging system is disclosed. The battery pack charging system includes a charger including a first magnet and a second magnet having an opposite magnetic pole from that of the first magnet, and a battery pack including a third magnet and a fourth magnet. The third magnet is configured to have the same pole as that of the first magnet, and the fourth magnet is configured to have a different pole from that of the third magnet. The pole of the fourth magnet is the same as that of the second magnet. When the battery pack is coupled to the charger, the first magnet faces the fourth magnet, and the second magnet faces the third magnet.

According to another aspect, a battery charger is disclosed. The battery charger includes a first magnet disposed on the charger, and a second magnet disposed on the charger and having an opposite magnetic pole from that of the first magnet. The magnets are configured to position a battery pack in the battery charger for charging.

BRIEF DESCRIPTION OF THE DRAWINGS

The accompanying drawings are included to provide a further understanding of the present disclosure, and are incorporated herein so as to constitute a part of this specification. The drawings illustrate exemplary embodiments of the present disclosure and, together with the description, serve to explain principles of the present disclosure. In the drawings.

DETAILED DESCRIPTION OF CERTAIN INVENTIVE EMBODIMENTS

Example embodiments will now be described more fully hereinafter with reference to the accompanying drawings. However, the inventive aspects may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1A:
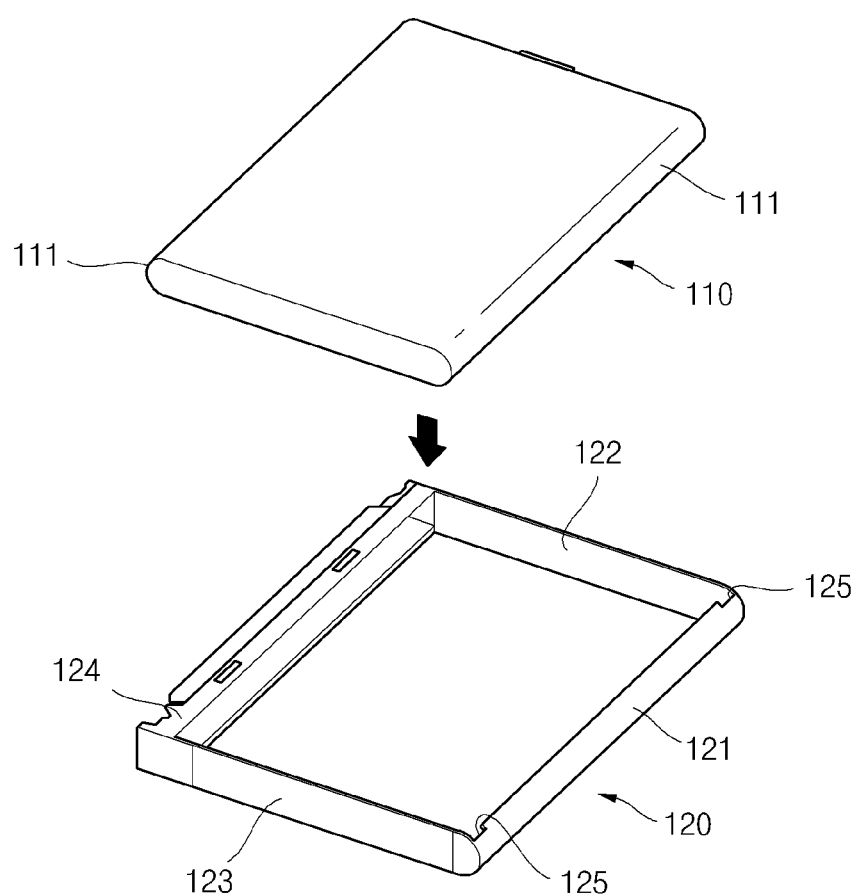
FIGS. 1A and 1B are exploded perspective views illustrating a battery pack according to some embodiments.
Figure 1B:
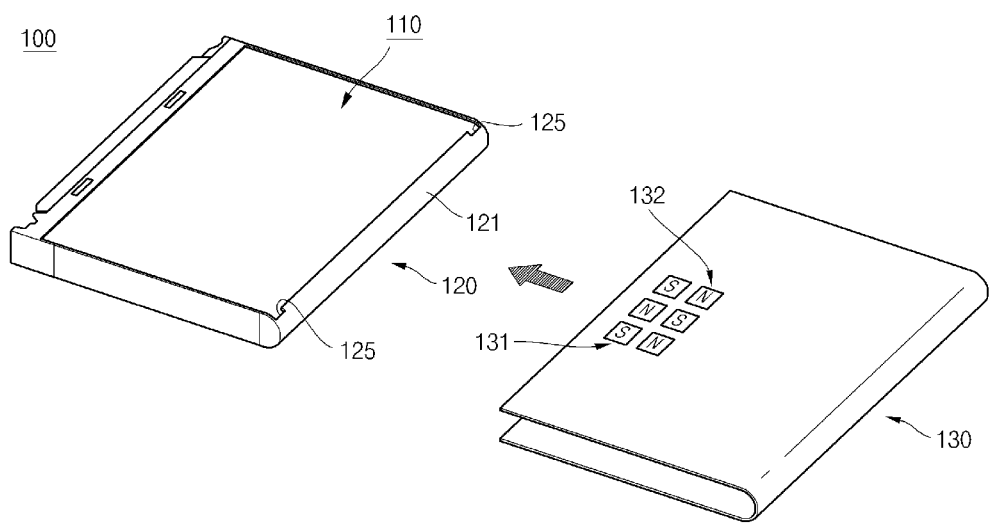

FIGS. 1A and 1B are exploded perspective views illustrating a battery pack according to some embodiments.

With reference to FIGS. 1A and 1B, the battery pack includes a battery 110, a cover frame 120, and a case 130.

The battery 110 includes one or more curved surfaces 111. The battery 110 has two large surfaces facing each other, and four small surfaces connecting the large surfaces. At least two of the four small surfaces are the curved surfaces 111.

The cover frame 120 includes side frames 121, 122, 123, and 124 surrounding side surfaces of the battery 110. Additionally, the cover frame 120 may include one or more recesses 125 formed in both ends of the frame 121 covering the curved surface 111 of the battery 110. The cover frame 120 surrounds the side surfaces of the battery 110 to protect the battery 110 from external shock. Since the frames 121, 122, 123, and 124 surrounding the battery 110 are integrally connected to form the cover frame 120, the battery 110 and the cover frame can be assembled during the same process. The recesses 125 formed in the ends of the frame 121 contacting the curved surface 111 may have a polygonal shape, an arc shape, or an equivalent thereof. When the battery 110 is placed so as to fit in the cover frame 120, the recesses 125 prevent plastic edges of the frame 121 from deforming through contact with the curved surface 111 of the battery 110.

The cover frame 120 may be formed of thermoplastic resin, or the like. For example, the cover frame 120 may be formed through injection molding, and the thermoplastic resin constituting the cover frame 120 may have elastic properties such that the cover frame 120 exhibits elasticity and restoration. The thermoplastic resin may include poly ethylene, acrylonitrile butadiene styrene copolymer, or the like. The material forming the cover frame 120 may be configured to have high elasticity and/or impact resistance. However, one of ordinary skill in the art will recognize that the material of the cover frame 120 is not limited to these examples, and may be provided as any suitable material for the cover frame 120.

The case 130 surrounds the large surfaces of the battery 110 and the frame 121 including the curved surface 111 having the recesses 125 to improve coupling force between the battery 110 and the cover frame 120. The case 130 may be formed of polypropylene or polyethylene. An adhesive may be provided to secure the cover frame 120 to the battery 110. One of ordinary skill in the art will recognize that the material and configuration of the case 130 is not limited to the above described examples.

One or more first magnets 131 and second magnets 132 are disposed on an outer surface of the case 130. The first magnets 131 and the second magnets 132 may be commonly referred to as battery pack magnets 133. The first magnets 131 and the second magnets 132 are configured to have a different polarization. For example, the first magnet 131 may have the N or S pole, and the second magnet 132 may have the S or N pole corresponding to the N or S pole of the first magnet. The second magnets 132 are disposed adjacent to the first magnet 131. The first magnets 131 and the second magnets 132 are arranged in an array of one or more lines. That is, a line in which the first magnets 131 and the second magnets 132 are formed may correspond to another line in which the first magnets 131 and the second magnets 132 are formed, such that the first magnets 131 and the second magnets 132 form an array.

Hereinafter, a system according to some embodiments for coupling a battery pack configured as described above to a charger to charge the battery pack will now be. The battery pack of the system may be similar to that described above, and a description of which will be omitted in describing the system for coupling the battery pack to the charger.

Figure 2A:
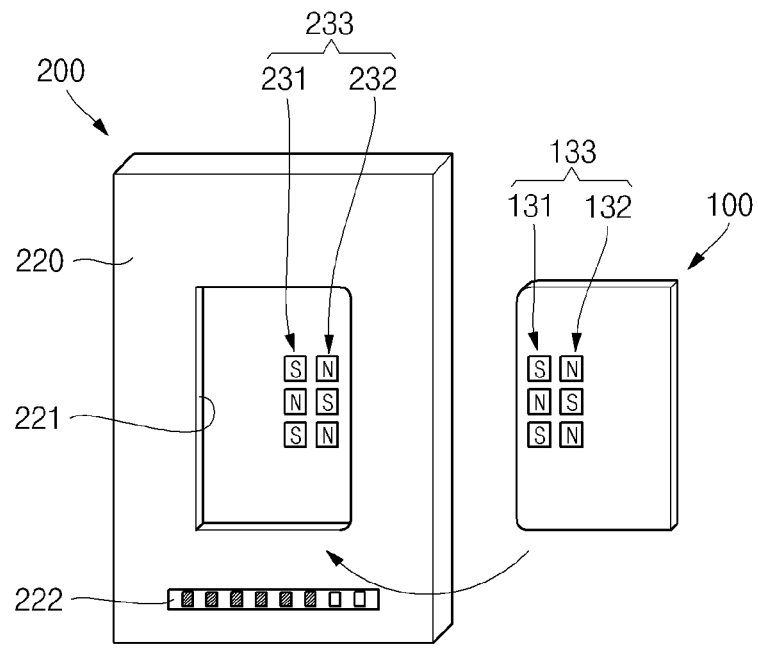
FIGS. 2A-2B are perspective views illustrating the front part of a battery pack charging system according to some embodiments.
Figure 2B:
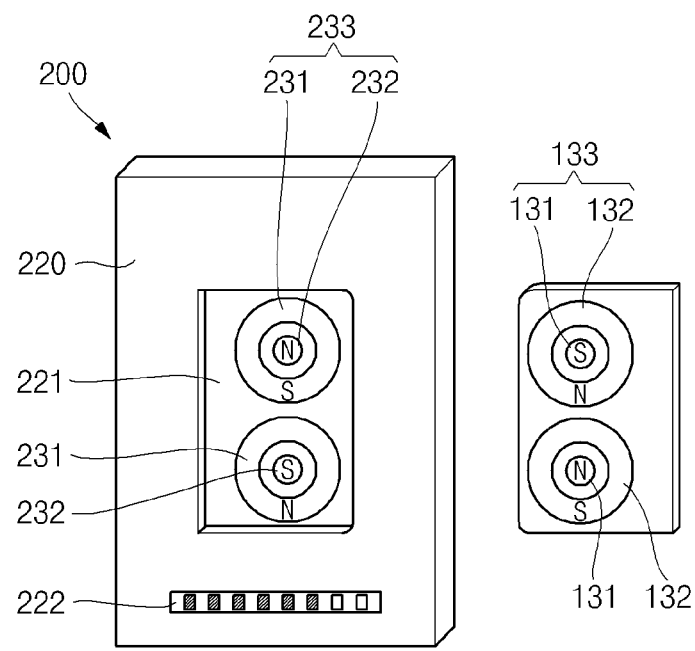
Figure 3:
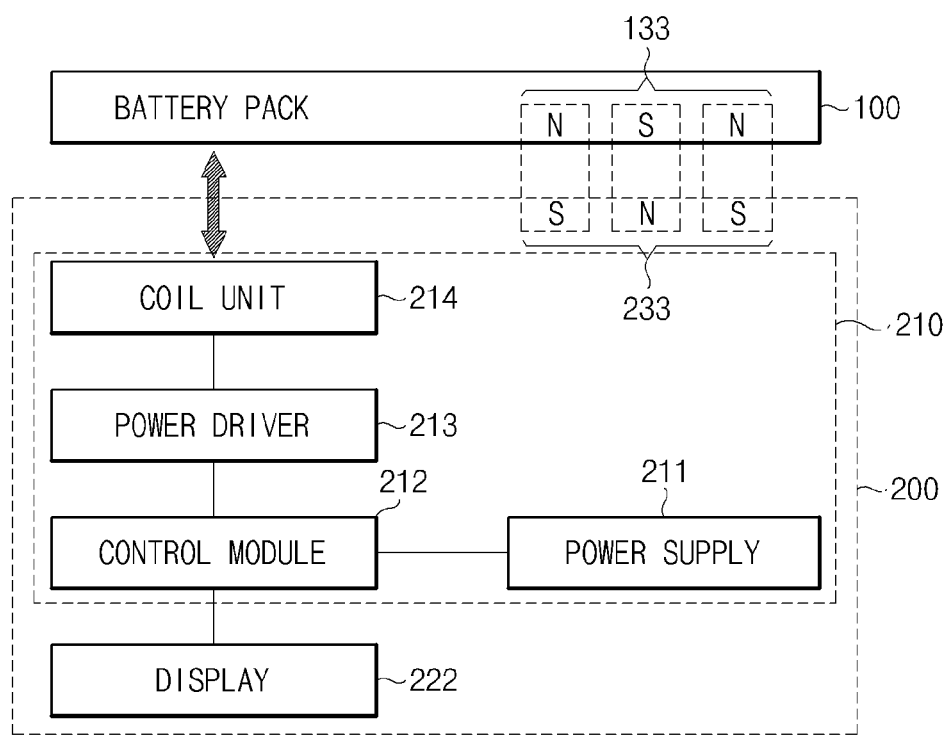
FIG. 3 is a block diagram illustrating the battery pack charging system of FIGS. 2A-2B.

FIGS. 2A-2B are perspective views illustrating the front part of a battery pack charging system according to some embodiments. FIG. 3 is a block diagram illustrating the battery pack charging system of FIGS. 2A-2B.

With reference to FIGS. 2A-2B and FIG. 3, the battery pack charging system includes a charger 200 and a battery pack 100.

The charger 200 includes a main body 210, a case 220 surrounding the main body 210, and a display 222 installed on the case 220. The main body 210 includes a power supply 211, a control module 212, a power driver 213, and a coil unit 214 therein.

The power supply 211 supplies power to the charger 200 according to a non-contact charging operation.

The control module 212 controls the power to be supplied from the power supply 211 to the power driver 213 to form a magnetic field in the battery pack 100, thereby charging the battery cells within the battery pack 100. According to a control signal supplied by the control module 212, amperage data of a current induced by a magnetic field configured to transmit data related to over current information and full charge information from the battery pack 100 charged through the coil unit 214 is detected. Based on the detected amperage data, it is determined whether the battery pack 100 is in a charging position. An indication of the position of the battery pack 100 is displayed to the display 222 installed on the case 220. For example, according to a control signal transmitted from the control module 212, when the positions of magnets 233 of the charger 200 are opposite to those of the battery pack magnets 133, if amperage data of an induced current is approximately equal to a reference amperage data, it is determined that the battery pack 100 is disposed at a correct position, and the display part 222 displays that the battery pack 100 is disposed at a correct position.

The power driver 213 converts power supplied from the power supply 211 to a high frequency alternating current according to a control signal from the control module 212 and outputs the high frequency alternating current to the coil unit 214.

The coil unit 214 uses the high frequency alternating current output from the power driver 213, to form a magnetic field, thereby charging the battery pack 100, and a current is induced by a magnetic field formed from the battery pack 100 to transmit data related to over current information and full charge information.

One or more third magnets 231 and fourth magnets 232 having a different pole from that of the third magnets 231 are disposed on the case 220. The third magnets 231 and fourth magnets 232 are installed on the case 220 of the charger 200 and may commonly be referred to as charger magnets 233. The third magnet 231 may have the N or S pole, and the fourth magnet 232 may have the S or N pole to correspond to the N or S pole of the third magnet 231. The fourth magnets 232 are disposed adjacent to the third magnets 231. The third magnets 231 and the fourth magnets 232 are formed in an array of one or more lines. For example, a line in which the third magnets 231 and the fourth magnets 232 are disposed may correspond to another line in which the third magnets 231 and the fourth magnets 232 are formed such that the magnets form an array.

The display 222 may include a light emitting diode which changes its color to display whether the battery pack 100 is in the correct charging position. For example, when the display 222 emits a red light before charging or after fully charging, the battery pack 100 may be at an incorrect position. When the display 222 emits a green light, the battery pack 100 may be at the correct position.

A charging recess 221 is disposed in the case 220. The battery pack 100 is placed in the charging recess 221 and is charged by the charger 200.

The battery pack 100 is placed in the charging recess 221 of the charger 200 and uses a current induced by a magnetic field formed from the charger 200 to charge battery cells therein. The battery pack 100 transmits data related to over current information and full charge information to the charger 200 through the coil unit 214.

The first magnets 131 and the second magnets 132 are disposed on the case 130 of the battery pack 100. FIG. 2A illustrates a front face of the battery pack 100 which is positioned in the charging recess 221 such that the surface of the front face is directly adjacent to the surface of the cavity 221. In the battery pack 100, the first magnets 131 have the same pole as that of the third magnets 231. The second magnets 132 have a pole that is different from that of the first magnets 131 and is the same as that of the fourth magnets 232. The first and second magnets 131 and 132 are disposed on the case 220 of the charger 200. The first magnets 131 may have the N or S pole that is the same as the pole of the third magnets 231, and the second magnets 132 may have the S or N pole that is the same as the pole of the fourth magnets 232. The second magnets 132 are disposed adjacent to the first magnet 131. Furthermore, the first magnets 131 and the second magnets 132 are formed in an array of one or more lines. That is, a line in which the first magnets 131 and the second magnets 132 are formed may correspond to another line in which the first magnets 131 and the second magnets 132 are formed such that an array of magnets is formed.

Alternatively, according to some embodiments, the second magnets 132 may be formed as circular magnets around the first magnets 131, and the third magnets 231 may also be formed as circular magnets around the fourth magnets 232. This configuration is illustrated in FIG. 2B. The shape and size of each of the battery pack magnets 133 may be configured to match the shape and size of the corresponding charger magnets 233.

According to some embodiments, when the battery pack 100 is placed in the charger 200 to charge the battery pack 100, the third magnets 231 face the second magnets 132, and the fourth magnets 232 face the first magnets 131. That is, the magnets 233 are attached to the charger 200, and the magnets 133 having the opposite pole to that of the magnets 233 are attached to the battery pack 100, thereby fixing the battery pack 100 at a correct position in the charger 200. If the magnets 233 of the charger 200 have the same pole as that of the magnets 133 of the battery pack 100, a resulting repulsive force between the magnets 133 and 233 repels the battery pack 100.

According to some embodiments, the magnets of the charger 200 have different poles from those of the magnets of the battery pack 100 and are disposed at the positions corresponding to those of the magnets of the battery pack 100, so as to orient and secure the battery pack 100 in a proper position for charging. As a result, the battery pack 100 may be securely positioned within the charger 200 and charging efficiency is improved. Additionally, the battery pack 100 may be identified based on a coupling effect between the battery pack magnets 133 and the charger magnets 233.

Figure 4:
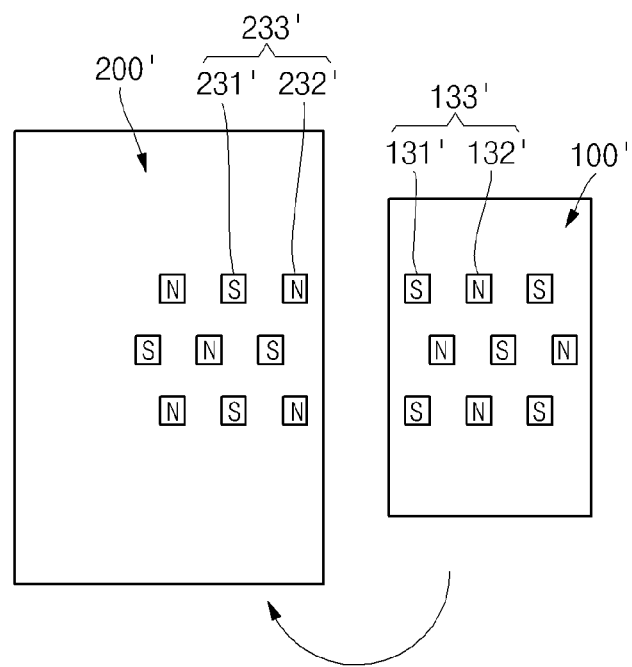
FIG. 4 is a front view illustrating an arrangement of magnets of a battery pack charging system according to some embodiments.

FIG. 4 is a front view illustrating an arrangement of magnets of a battery pack charging system according to some embodiments. According to some embodiments, the battery pack charging system may include an inductive charging system.

With reference to FIG. 4, in a battery pack charging system according to some embodiments, magnets 233' attached to a case of a charger 200' and magnets 133' attached to a case of a battery pack 100' may be arrayed in rows or columns. Additionally, when each of the magnets 233' mate with each of the magnets 133', their poles are opposite to one another.

Thus, according to some embodiments, magnets 233' and magnets 133' may be formed in different array configurations in order to identify the battery pack 100' according to the particular array configuration and resulting coupling effect. While the magnets 233' and 133' are illustrated as square shaped magnets, the magnets are not limited to these configurations. For example, the magnets may be formed as circular magnets, or the like. Additionally, the size of each of the magnets may vary in order to form different arrays for particular battery packs 100' and charging units 200'.

Figure 5:
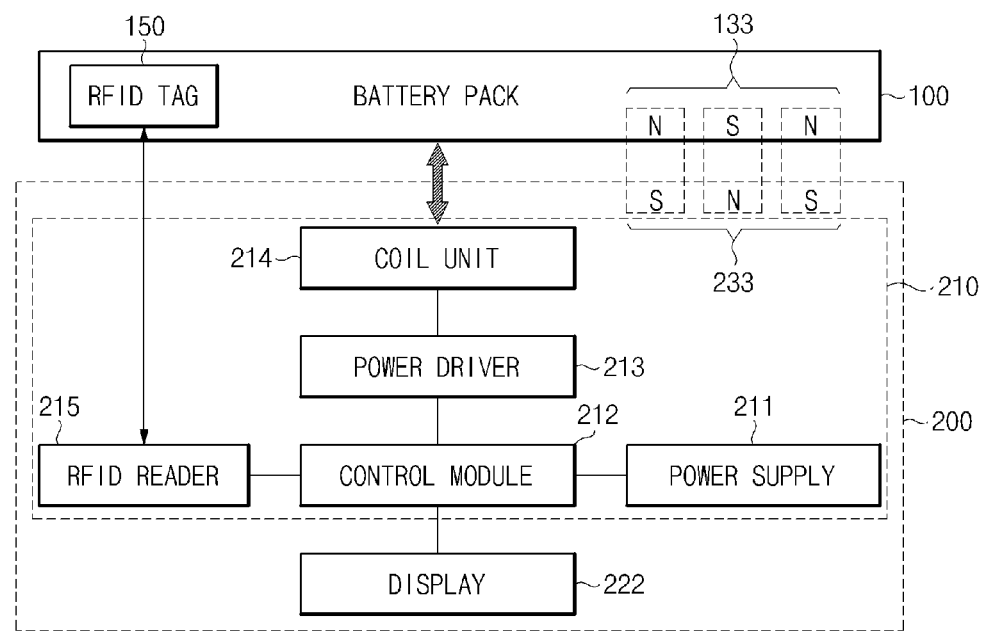
FIG. 5 is a block diagram illustrating a battery pack charging system according to some embodiments.

FIG. 5 is a block diagram illustrating a battery pack charging system according to some embodiments.

With reference to FIG. 5, a battery pack charging system according to some embodiments may include the battery pack charging system of FIG. 3 and an RFID system. That is, an RFID tag 150 may be attached to the battery pack 100, and an RFID reader 215 may be attached to the charger 200. The RFID reader 215 may include a transmitter (not shown) providing charge information to the battery pack 100, and a receiver (not shown) receiving an identification and other information from the RFID tag 150.

According to a control signal transmitted from the control module 212, the display 222 changes an emitted light color to display whether an RFID of the charger 200 and the battery pack 100 is recognized and whether the positions of the magnets 233 and 133 are correct.

Therefore, according to some embodiments, the magnets 233 attached to the charger 200 and the magnets 133 attached to the battery pack 100 may be configured in different arrays. Additionally, the RFID system may be used to more accurately identify the battery pack 100.

According to some embodiments described above, the magnets of the charger have different poles from those of the magnets of the battery pack and are disposed at the positions corresponding to those of the magnets of the battery pack, such that the battery pack is positioned and fixed in a correct position. As a result, charging efficiency is improved.

According to some embodiments, since magnets of battery packs are disposed at different positions, if a magnet of a battery pack does not correspond to a magnet of a charger, the magnets repel each another to prevent a charging operation. As a result, identification of a battery pack is simplified.

As described above, according to some embodiments a battery pack and a charging system including the battery pack are disclosed. The system uses magnets to fix the battery pack at a correct position, thereby improving charging efficiency.

According to some embodiments, a battery pack includes at least one first magnet, and a second magnet having a different pole from that of the first magnet. The first magnet and the second magnet may be disposed on a case. The second magnet may be disposed around the first magnet. The first magnet and the second magnet may formed in array of at least one line.

According to some embodiments, a battery pack charging system includes a charger including at least one first magnet and a second magnet having a different pole from that of the first magnet The system includes a battery pack including at least one third magnet and at least one fourth magnet. The third magnet is configured to have the same pole as that of the first magnet, and the fourth magnet is configured to have a different pole from that of the third magnet. The pole of the fourth magnet is configured to be the same as that of the first magnet. When the battery pack is coupled to the charger to charge the battery pack, the first magnet faces the fourth magnet, and the second magnet faces the third magnet.

The first magnet and the second magnet may be disposed on a case of the charger. The second magnet may be disposed around the first magnet. The first magnet and the second magnet may be arrayed in at least one line.

An arrangement of the first magnet and second magnet may correspond to an arrangement of the third magnet and fourth magnet.

A display may be disposed on a case of the charger. The display may display whether magnet positions of the charger and the battery pack are correct.

A radio frequency identification (RFID) tag may be attached to the battery pack, and an RFID reader may be attached to the charger to recognize the RFID tag.

Exemplary embodiments have been disclosed herein. Although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack charging system comprising:
a battery pack; and
a charger comprising:
a first magnet and a second magnet having an opposite magnetic pole from that of the first magnet;
a coil configured to induce a current in the battery pack when the battery pack is aligned within the charger;
a detection unit configured to detect amperage data of the induced current in the battery pack and configured to compare the amperage data of the induced current to a reference current value;

wherein the battery pack includes a plurality of third magnets and a plurality of fourth magnets, the arrangement of the plurality of third magnets and the plurality of fourth magnets corresponding to an arrangement of the first and second magnets of the charger, wherein the arrangement of the plurality of third magnets and the plurality of fourth magnets with regard to the first and second magnets identifies the battery based on the coupling effect between the plurality of third magnets and the plurality of fourth magnets and the first and second magnets;

wherein, when the battery pack is coupled to the charger, the first magnet faces the fourth magnet, the second magnet faces the third magnet, and a current is induced in the battery pack which is detectable by the detection unit, the induced current being indicative of proper alignment of the battery pack in the battery charger when the amperage data of the induced current corresponds to the reference current value.

2. The battery pack charging system as claimed in claim 1, wherein the first magnet and the second magnet are disposed on a case of the charger.

3. The battery pack charging system as claimed in claim 1, wherein the second magnet is disposed around the first magnet.

4. The battery pack charging system as claimed in claim 1, wherein the plurality of third and fourth magnets are formed in an array of at least one line.

5. The battery pack charging system as claimed in claim 4, wherein the charger includes a plurality of first magnets and a plurality of second magnets, and wherein an arrangement of the plurality of first magnets and second magnets corresponds to an arrangement of the plurality of third magnets and fourth magnets.

6. The battery pack charging system as claimed in claim 1, wherein
the charger further comprises a display, and
wherein the display displays whether magnet positions of the charger and the battery pack are correct.

7. The battery pack charging system as claimed in claim 1, wherein
the battery pack further comprises a radio frequency identification (RFID) tag attached to the battery pack, and
wherein the charger further comprises an RFID reader attached to the charger, wherein the RFID reader is configured to communicate with the RFID tag to identify the battery pack.

8. The battery pack charging system as claimed in claim 1, wherein the first magnet and the second magnet are circularly shaped, and wherein the second magnet is formed around the first magnet.

9. The battery pack charging system as claimed in claim 8, wherein the third magnet and the fourth magnet are circularly shaped to correspond to the first magnet and the second magnet.

10. A battery charger comprising:
a first magnet disposed on the charger; a second magnet disposed on the charger and having an opposite magnetic pole from that of the first magnet, wherein the magnets are configured to position a battery pack in the battery charger for charging, the battery pack including a plurality of third magnets and a plurality of fourth magnets, wherein the arrangement of the plurality of third magnets and the plurality of fourth magnets with regard to the first magnet and the second magnet identifies the battery based on the coupling effect between the first magnet and second magnet and the plurality of third magnets and the plurality of fourth magnets;
a coil configured to induce a current in the battery pack when the battery pack is positioned in the charger;
and
a detection unit configured to detect amperage data of the induced current in the battery pack and compare the amperage data of the induced current to a reference current value, the amperage data of the induced current being indicative of proper alignment of the battery pack in the battery charger when the amperage data of the induced current corresponds to the reference current value.

11. The battery charger as claimed in claim 10, wherein the first magnet and the second magnet are disposed in a recessed portion of the battery charger.

12. The battery charger as claimed in claim 11, wherein the recessed portion comprises edges corresponding to a shape of the battery pack.

13. The battery charger as claimed in claim 10, and wherein the plurality of third magnets are arranged in an array of at least one line.

14. The battery charger as claimed in claim 10, wherein the first magnet and the second magnet are circularly shaped, and wherein the second magnet is formed around the first magnet.

* * * * *